United States Patent [19]

Wirth

[11] 4,147,333

[45] Apr. 3, 1979

[54] PROGRAMMED PRESSURE REGULATOR FOR CONTROLLING THE SUPPLY OF GAS PRESSURE TO A LOAD DEVICE

[75] Inventor: Jon C. Wirth, Mequon, Wis.

[73] Assignee: Heath Engineering Company, Fort Collins, Colo.

[21] Appl. No.: 791,047

[22] Filed: Apr. 26, 1977

[51] Int. Cl.² .............................................. B23K 37/00
[52] U.S. Cl. .................................................... 266/48
[58] Field of Search ......................... 137/487.5; 266/48

[56] References Cited

U.S. PATENT DOCUMENTS

| 3,369,561 | 2/1968  | Zimmerman et al. | 137/487.5 X |
| 3,464,438 | 9/1969  | Maurer           | 137/487.5   |
| 3,533,442 | 10/1970 | Lange et al.     | 266/48 X    |
| 3,726,307 | 4/1973  | Carman et al.    | 137/487.5   |
| 3,823,928 | 7/1974  | Stolin et al.    | 266/76      |

Primary Examiner—Roy Lake
Assistant Examiner—Paul A. Bell

Attorney, Agent, or Firm—Andrus, Sceales, Starke & Sawall

[57] ABSTRACT

Pressurized gases supplied to a load device such as metal flame cutting torch includes separate dome regulators for each gas supply. Each regulator includes a pressure responsive input chamber connected to the corresponding supply by a supply solenoid valve. A second solenoid valve connects the input chamber to the discharge side of the dome regulator. A pressure transducer senses the output pressure of the regulator and develops a feedback signal which is compared with a reference signal in a differential amplifier to generate an error output signal. The reference signal may be manually set or be derived from a programmed numerical control, a tape control or the like. The valves are totally opened and closed. Restricted orifices are connected downstream of the solenoid valves to permit soft changes in the load gas flow. In an oxygen gas cutting control, a separate adjustable orifice provides for controlling the piercing rate. Solenoid operated dump valves are connected to dump the regulator and main line of the cutting oxygen.

6 Claims, 2 Drawing Figures

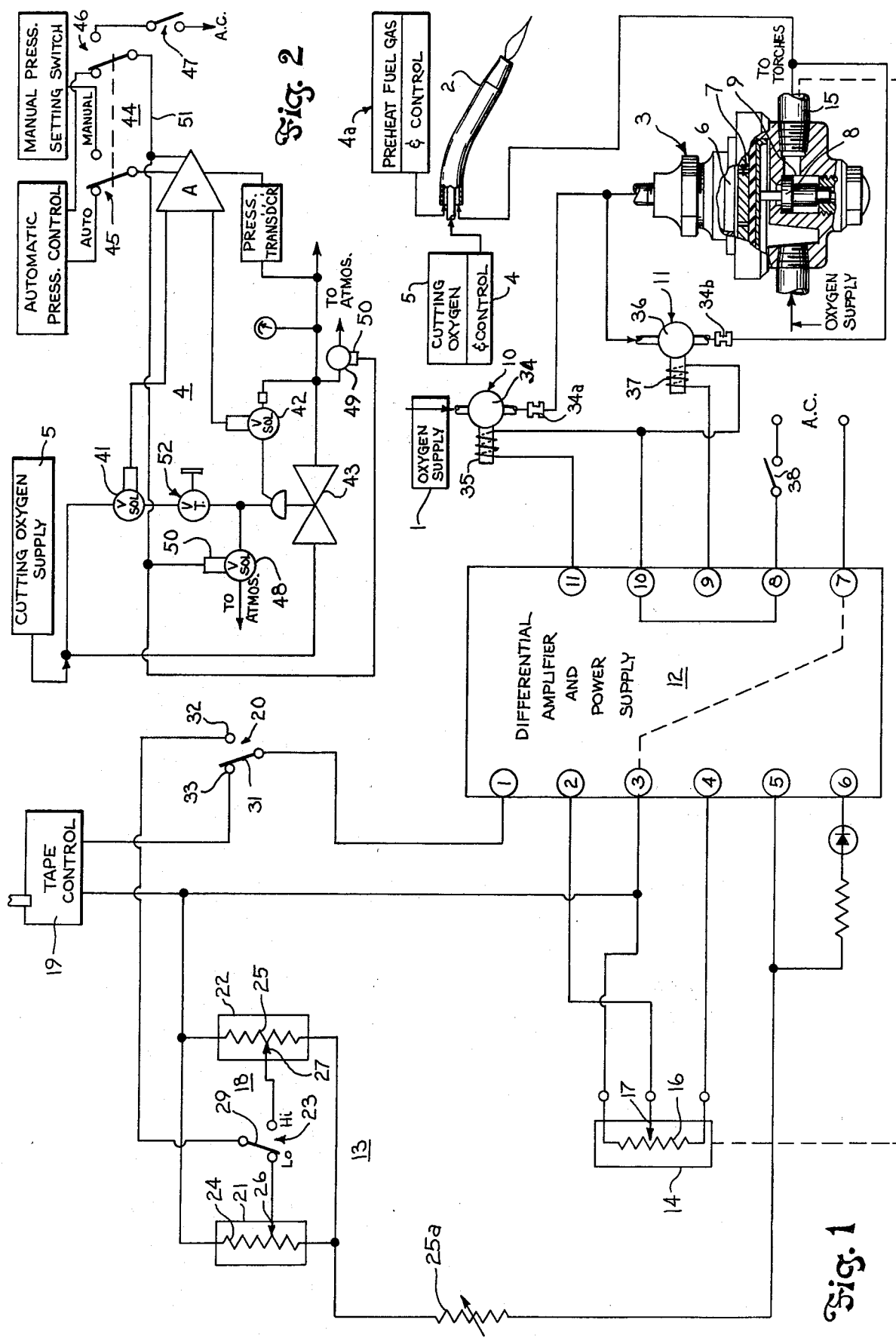

PROGRAMMED PRESSURE REGULATOR FOR CONTROLLING THE SUPPLY OF GAS PRESSURE TO A LOAD DEVICE

BACKGROUND OF THE INVENTION

This invention relates to a pressure regulating system for controlling and varying the pressure of flowing gases.

Various industrial applications employ gases for controls and for work functions in which the pressure of the flowing gas is controlled to produce a desired function. For example, in flame and plasma cutting or machining of metal parts, a pressure regulator is employed to produce a selected pressure of the gases including the preheat oxygen and fuel gases and the cutting oxygen. The necessary pressures for various thicknesses of material being but are known and are preset to a fixed pressure. Although numerical controls have been employed for controlling the cutting speed, torch height and the like, the pressure settings have employed manually set control valves for setting of a pressure regulator connected in the supply lines for several supply gases. Although such systems have been generally employed and provide satisfactory cutting systems the operator is required to return to the supply and manually adjust the valve for the various work applications.

SUMMARY OF THE PRESENT INVENTION

The present invention is directed to a simple and relatively low cost flow control system for accurately establishing pressurized gases to a load device such as metal flame cutting torch or torches. Generally, in accordance with the present invention, a dome regulator connects the gas supply to the torches to provide a regulated gas supply. The regulator includes a pressure responsive input chamber. A first solenoid valve means connects the input chamber to the gas supply and a second solenoid valve means connects the input chamber to the discharge side of the dome regulator. A pressure transducer senses the output pressure of the regulator and develops a feedback signal which is compared with a reference signal to generate output signals related to deviation from a desired level. A differential amplifier provides a highly satisfactory comparator which is connected to selectively energize the first and second solenoid valves. The valves are opened and closed to supply and bleed fluid pressure to and from the regulator input chamber if the output pressure deviates from the level related to the reference signal. The differential amplifier includes a suitable deadband adjacent the reference pressure within which the output pressure may vary without a continuous turning on and off of the two solenoid valve means. The solenoid valves are preferably constructed with restricted orifice means or a separate series orifice means, which is preferably adjustable, connects the solenoid valve means to the dome regulator to permit a soft application and change in the load gas flow to the consuming load such as the flame cutting torches. In an oxygen gas cutting control a separate adjustable valve is preferably provided to set the pierce rate of the cutting jet. Such a control also preferably includes a solenoid operated dump valve means connected to the input chamber.

The dump valve is controlled by a switch means connected in the power circuit to open the valve upon deenergizing of the control and thereby rapidly turning off the regulator.

The reference signals may be manually controlled by a suitable signal generator such as an adjustable potentiometer or may be provided from a programmed control device such as a magnetic tape device, a numerical control device, a small computer or other suitable timing and signal generating means. The control may, of course, also incorporate optional features, such as separate high-low preheat oxygen and fuel gas controls for a flame cutting apparatus, the additional solenoid operated dump valve and the like.

The present invention employing an on-off supply of the control fluid to the regulators in response to the output of the comparators provides a simple and inexpensive control which, however, provides accurate and reliable output pressure conditions.

BRIEF DESCRIPTION OF THE DRAWING

The drawing furnished herewith illustrates a preferred contruction of the present invention in which the above advantages and features are clearly disclosed as well as others that will readily be understood from the following description.

In the drawing:

FIG. 1 is a schematic diagram of an embodiment of the invention for controlling of the preheat oxygen flow to a flame cutting torch; and FIG. 2 is a simplified illustration of an embodiment for controlling of the cutting oxygen to the flame cutting torch.

DESCRIPTION OF THE ILLUSTRATED EMBODIMENTS

Referring to the drawing and particularly to FIG. 1, an oxygen tank 1 is shown connected to a cutting torch 2 in series with a pressure dome regulator 3 for providing preheat oxygen to torch 2 at a regulated pressure. A separate control unit or system 4, such as shown in FIG. 2, connects a cutting oxygen source 5 to torch 2. Fuel gas is also supplied from a separate control system 4a, as hereinafter described. Regulator 3 may be of a known construction and is illustrated as a spring-loaded diaphragm unit having an input chamber 6 for positioning a diaphragm assembly 7. The assembly 7 actuates a spring-loaded valve unit 8 in a valved chamber 9 to control the output pressure. The valve unit 8 is thus positioned with pressure in the chambers 6 and 9 in balance, with the diaphragm assembly moving to correspondingly restrict and thereby regulate the output pressure. The present invention is particularly directed to controlling the operation of the regulator 3 based on the comparison of a reference signal and a feedback signal corresponding to the desired and actual regulated pressures for turning on and off a supply solenoid valve 10 and a bleed solenoid valve 11 to the dome regulator 3 and particularly the input chamber 6. Generally, a signal comparator 12 has a first input connected to a referenced signal source 13 and a second input connected to a feedback signal source 14 connected to sense the output pressure condition of regulator 3. The output of the comparator 12 actuates and opens either valve 10 or valve 11 to reset the regulator 3 if the signal from sources 13 and 14 indicate an unacceptable pressure deviation. If valve 10 opens, the pressure to the input chamber 6 increases and the output pressure will increase until a balanced state is created across the diaphragm assembly 7. Conversely, if valve 11 opens, pressure is bled from chamber 6 and the spring-loaded valve unit 8 closes and reduces the output pressure until a balanced condition is created across diaphragm assembly 7.

In the illustrated embodiment of FIG. 1, the feedback signal source 14 is a pressure transducer connected in the main gas line 15 to the downstream or output side of the regulator 3. Transducer 14 is a potentiometric device such as that sold by Bourns, and includes a resistor 16 and an output tap 17 which provides a D.C. voltage signal of a level linearly related to the output pressure.

The reference signal source 13 includes either a manual preset unit 18 or a programmed command unit 19 selectively connected by a selection switch 20 as the input to the comparator 12.

The manual preset unit 18 includes a low preheat potentiometer 21 and a high preheat potentiometer 22 selectively connected in circuit by a single pole, double throw selection switch 23. Potentiometers 21 and 22 are similar devices having resistors 24 and 25 connected to a suitable voltage supply to provide different voltage ranges. A series connected, adjustable trim resistor 25a is shown connected in series with resistors 24 and 25. Each also includes a manually adjustable tap, with tap 26 of potentiometer 21 and the tap 27 of potentiometer 22 connected to the opposite side of switch 23. The common pole 29 of switch 23 is connected to one side of the selection switch 20.

Switch 20, as hereinafter described, is one section of a four pole, double throw switch unit 30. Switch 20 has a common pole 31 connected as the reference input to comparator 12 and manually set to a manual contact 32 connected to pole 29 of switch 23 or to an automatic contact 33 connected to the programmed input or command unit 19.

The command unit 19 may be any suitable automatic programmed signal source, such as the known numerical control devices, a tape control unit, separate feed rate ramp function gennerators, or a simple multiple output timing device which generates an output reference signal suitable as the reference input to the comparator. Any of the available numerical controls presently employed, for example, to control torch positions and/or speed might be employed to produce appropriate input reference signals. The command unit 19 would of course, be constructed to synchronously provide the preheat oxygen signal; appropriate signals for the cutting oxygen and for the preheat fuel gas regulator system as subsequently described.

The reference input signal is thus derived from the desired reference signal source by positioning of switches 20 and 23.

The comparator 12 may be any suitable signal comparing circuit and is preferably a suitable differential amplifier having a deadband range, which is preferably adjustable. The differential amplifier has a first output connected to the supply solenoid valve 10 and a second output connected to the bleed solenoid valve 11. Both outputs are totally off if the input signals are within the deadband range or one of the outputs is totally on if the input signals deviate beyond such range.

The solenoid valves 10 and 11 are any suitable well-known valves. Valve 10 includes a valve unit 34 connected between the input chamber 6 and the gas supply line 15 upstream of regulator 3 and having an operating solenoid 35 connected to the first output of amplifier 12. Valve 11 similarly includes a valve unit 36 connected between input chamber 6 and the downstream side of regulator 3 and having an operating solenoid 37 connected to the second output of comparator 12.

A main on-off switch 38 is connected to the main power input to the comparator 12 which includes appropriate regulating and converting circuit to power the amplifying means and to power the solenoids. Thus, the differential amplifier may be a suitable transistor circuit having solid state control switches, such as "Triac" control rectifiers for supplying A.C. power to the solenoids 35 and 37.

In operation, the present reference signal is supplied from reference source 13 and compared with the feedback signal from pressure transducer 14. The output of the amplifier 12 is dependent on whether the feedback signal, and, therefore, the output pressure, is greater or less than the reference signal from the connected reference source. When the regulated pressure is lower than the programmed pressure, the solenoid 10 opens and pressure in the regulator control dome or input chamber 6 is increased until the desired pressure is reached at which point the solenoid 10 closes. The supply gas passes through a flow-restricting orifice 34a in valve unit 34 into the pressure loading dome chamber 6 causing the regulated pressure to slowly increase the main gas pressure in line 34.

Conversely, if the regulated pressure is higher than the programmed pressure, the solenoid 11 opens and vents the input chamber 6 to the output side of regulator 3 and allows pressure to bleed out until the desired pressure has been gradually reduced to the desired level at which point the solenoid 10 closes.

As described, the pressure signals to the dome regulator 30 are preferably created through suitable orifice means to gradually change the output pressure and thus provide an appropriate soft pressure change. The valves 10 and 11 may be formed with internal orifice means or separate orifice means, such as shown at 34a and 34b in FIG. 1, and may be inserted in the connected lines to the input chambers 6. The orifices are located downstream of the solenoid valves to maintain proper operation of the system.

Further, the other similar and modified controls are provided as required. As noted previously, in the particular illustrated embodiment of a cutting torch, in addition to preheat oxygen, preheat fuel gas is supplied to the torch and mixed with preheat oxygen to provide the desired preheat characteristic. The preheat fuel gas would be separately regulated and supplied to the torch for mixing with the preheat oxygen. A separate control essentially the same as that just described for the preheat oxygen would be provided. The control would preferably include a manual presettable control and the programmed control. The cutting oxygen is similarly controlled but includes additional dump controls to rapidly terminate supply of cutting oxygen. For example, FIG. 2 illustates a similar regulator control system for the cutting oxygen supply connection in which a pressure increase solenoid 41 and a pressure decrease solenoid 42 are similarly connected to control a regulator 43. In the cutting oxygen supply, an auto-manual selection switch 44 includes a reference source switch section 45 and a power switch section 46. Thus, in the automatic programmed position power is supplied to the control under the program control. In manual control, a separate on-off switch 47 controls the supply of power to the system.

The switch sections 45 and 46 preferably form parts of the four pole, double throw switch referred to as including the preheat selction switch 20. The fourth section would be a switch unit connected in a preheat gas control similar to the circuit of FIG. 1.

In the oxygen cutting control system, separate solenoid valves 48 and 49 directly connect the regulator input chamber and output side or line to atmosphere. Valves 48 and 49 are normally open units. Each valve 48 and 49 is similarly constructed as a non-orificed valve and has a solenoid 50 connected across the incoming power line 51 to the output side of the automatic and manual control switches 46 and 47. The valve 48 vents the regulator 43 and valve 49 vents the output chamber and line, except when cutting and solenoid 50 is energized. The preheat oxygen and fuel gas are generally supplied continuously. The cutting oxygen flow is, however, started and stopped with each cut. It is important to insure that each cut is initiated with an appropriate gradual increase in the cutting oxygen supply.

The cutting oxygen, of course, controls the piercing rate and the control system, as shown in FIG. 2, further includes an adjustable valve or orifice unit 52 connected between the pressure increase solenoid 41 and the input chamber of the dome regulator.

Thus, the system of FIG. 2 functions essentially in the manner of the preheat oxygen control shown in FIG. 1, except that the dome regulator 43 and torch line are normally separately vented and the adjustable pierce rate control is operative in the supply or pressure increasing portion of the cycle.

The dome regulator in combination with the on-off type control provides a reliable and economic feedback system for establishing and maintaining a pressure gas supply to a consuming device such as a cutting torch. The components used are readily commercially available items at a reasonable cost. The several components are relatively sturdy and have a long life and thus the system is adapted to commercial and production shop usage.

Various modes of carrying out the invention are contemplated as being within the scope of the following claims, particularly pointing out and distinctly claiming the subject matter which is regarded as the invention.

I claim:

1. A flame cutting apparatus having a torch means, comprising a gas supply means for supplying gas to said torch means, a dome valve regulator having an input chamber and a valved chamber including a valve operator for opening and closing a valve unit in said valved chamber and said operator including a moving wall of said input chamber and operable to fully open or close said supply valve unit, said valved chamber having an inlet port connected to the gas supply means and an outlet port connected to the torch means, a solenoid supply valve connecting said supply means to said input chamber, said supply valve having an orifice connected in series to said input chamber, a solenoid bleed valve connecting said input chamber to the outlet side of the valved chamber, a pressure transducer coupled to the outlet side of the valved chamber and developing a signal proportional to the output pressure of the gas supplied to the torch means, a reference signal source, a differential amplifier having a pair of inputs connected to said transducer and said reference signal source and having a first signal output at a selected level above said references and a second signal output at a selected level below said reference and defining a deadband range between said selected reference levels to selectively turn both said solenoid valves off in said deadband range and to oppositely turn said solenoid valves fully on and off outside said deadband range and thereby oppositely open and close said supply valve and said bleed valve, said reference signal means includes a plurality of signal sources, said plurality of signal sources includes a programmed signal source and a plurality of manually presettable signal sources, and a switch means for selectively connecting said signal sources to said amplifier.

2. A flame cutting apparatus including a flame jet including a preheat fuel gas and preheat oxygen and a cutting oxygen, comprising a preheat gas supply means, a preheat oxygen supply means, a cutting oxygen supply means, a preheat fuel dome regulator, a preheat oxygen regulator and a cutting dome regulator, each of said regulators having an input chamber and a valved chamber including a valve operator for opening and closing a valve unit in said valved chamber and said operator including a moving wall of said input chamber and operable to fully open or close said corresponding valve unit, separate solenoid supply valves connecting said preheat fuel gas supply means and said preheat oxygen supply means and said oxygen supply means to sad corresponding input chambers, orifice means connected in series with said supply valves, separate solenoid bleed valves connecting said input chmabers to the output side of the corresponding valved chambers, preheat fuel gas and oxygen pressure transducers, a cutting oxygen pressure transducer, each of said transducers being coupled to the outlet sides of the corresponding valved chambers and developing a signal proportional to the corresponding output pressures, preheat fuel gas and oxygen reference signal sources, a cutting oxygen reference signal source, a preheat fuel gas and oxygen differential amplifiers, a cutting oxygen differential amplifier, each of said amplifiers having a pair of inputs connected respectively to said corresponding transducers and said corresponding reference signal sources and having a first signal output at a selected pressure level above said corresponding reference level and a second signal output at a selected level below said corresponding reference level to selectively turn said corresponding solenoid valves on and off and thereby open and close said supply valves and said bleed valves to regulate the pressures of the preheat gas and of the cutting oxygen.

3. The cutting apparatus of claim 2 wherein dump solenoid valves are connected to the input chamber of said cutting oxygen dome regulator and to the output side of said cutting oxygen dome regulator, and a control switch means connected to supply power to said apparatus and to simultaneously energize said dump solenoid valves.

4. The cutting apparatus of claim 2 including an adjustable pierce rate orifice means connected between said oxygen supply valve and said oxygen dome regulator.

5. The apparatus of claim 2 wherein each of said reference signal sources includes a plurality of signal units including at least one manually presettable signal unit and an automatic programmed signal unit, a selection switch means connected to said plurality of signal units and having a first state simultaneously connecting the manually presettable signals to the differential amplifiers and a second state connecting said programmed signal units to the differential amplifiers.

6. The apparatus of claim 5 wherein said reference source means includes a preheat programmed pressure control signal means for fuel gas and for said preheat oxygen and a cutting oxygen programmed pressure control signal means for controlling the corresponding reference signals.

* * * * *

UNITED STATES PATENT AND TRADEMARK OFFICE
CERTIFICATE OF CORRECTION

PATENT NO. : 4,147,333
DATED : April 3, 1979
INVENTOR(S) : JON C. WIRTH

It is certified that error appears in the above-identified patent and that said Letters Patent are hereby corrected as shown below:

| | | |
|---|---|---|
| Column 1, | Line 18, | After "being" cancel "but" and insert --- cut ---; |
| Column 3, | Line 37, | After "function" cancel "gennerators" and insert --- generators ---; |
| Column 4, | Line 13, | After "and" cancel "thereofore" and insert --- therefore ---; |
| Column 4, | Line 24, | This is not a new paragraph; |
| Column 4, | Line 37, | After "the" cancel "connected" and insert --- connecting ---; |

UNITED STATES PATENT AND TRADEMARK OFFICE
CERTIFICATE OF CORRECTION

PATENT NO. : 4,147,333
DATED : April 3, 1979
INVENTOR(S) : JON C. WIRTH

It is certified that error appears in the above–identified patent and that said Letters Patent are hereby corrected as shown below:

Column 4,     Line 55,     After "Fig. 2" cancel "illustates" and insert --- illustrates ---;

Column 6,     Line 21,     Before "corresponding" cancel "sad" and insert --- said ---;
    CLAIM 2

CLAIM 9, Line 14)

Column 6,     Line 23,     After "input" cancel "chmabers" and insert --- chambers ---.
    CLAIM 2

CLAIM 9, Line 17)

Signed and Sealed this

Fourteenth Day of August 1979

[SEAL]

*Attest:*

LUTRELLE F. PARKER
*Attesting Officer*      *Acting Commissioner of Patents and Trademarks*